Oct. 2, 1962    R. C. IMMEL    3,056,156
PIPE LINE PLUGS
Filed Aug. 3, 1960

INVENTOR.
RALPH CONRAD IMMEL
BY
*Alexander L. Dowell*
ATTORNEYS 3,056,156
PIPE LINE PLUGS
Ralph Conrad Immel, 5530 Palamar Lane, Dallas, Tex.
Filed Aug. 3, 1960, Ser. No. 47,240
5 Claims. (Cl. 15—104.06)

My invention relates to resilient plugs of the type which are fluid propelled within a pipe line, and more particularly relates to plugs which can be propelled in one direction only and which automatically adapt their cross-sectional size to the diameter of the pipe-line to maintain snug sealing and wiping contact therewith at all times.

It is the principal object of this invention to provide a pipe-line plug comprising a cup-shaped elongated member of rubber-like resilient material which is introduced axially into the pipe-line and then subjected to fluid pressure on its concave side so as to further elongate the rubber member axially of the pipe. As the member is elongated axially, it shrinks in diameter transversely of its axis until it can slide along the pipe-line. Since it is fluid pressure which elongates the rubber member and thereby shrinks its girth, the periphery of the member must always seal against the pipe-line walls or else the pressure will be lost. Therefore, if the plug enters a portion of pipe of larger diameter, it will automatically shorten its length and thereby increase its girth to maintain contact. Conversely, if the plug encounters a section of pipe of reduced diameter, it will enter its nose therein and begin elongating until its cross-sectional size has been reduced enough to permit sliding of the remaining portion of the plug into the reduced section of pipe.

Another principal object of the invention is to provide a go-devil type of pipe-line plug having a molded valve structure in its nose, the valve structure comprising a slit or opening surrounded by lips which normally extend back into the interior of the cup-shaped plug, but which lips can be forced to turn inside-out and open the nose of the plug at the slit. Thus if the plug becomes stuck behind debris which tends to collect in front of it and the pressure behind the plug rises above a predetermined value, the valve structure can turn inside-out and permit a jet of fluid to escape through the nose of the plug which cleans out the debris so that the plug can again advance along the pipe-line when the pressure falls and the lips resume their normal position within the plug.

A further important object of my invention is to provide a separator plug which is especially suitable for use as a cement plug in an oil or gas well casing for separating the cement below the plug from the mud thereabove, the plug wiping the casing clean as it progresses therein. Once the cement reaches the desired position down in the casing, the plug effectively keeps the cement down since the upward pressures thereon from the formations therebelow swells the girth of the plug and prevents its upward travel. Thus, it is unnecessary to valve the top of the casing or to provide a packer above the cement. There is a considerable advantage herein because the work of bailing the casing dry can be commenced immeditely as soon as the plug has been pumped down to the desired level. The efficiency of wiping of the casing by the plug depends on the degree of shrinking of the girth of the plug which is necessary in order to introduce the plug into the casing. The present plug can also be substituted in other applications in place of conventional packers. For instance, two plugs can be oriented back-to-back to serve as a fracturing packer assembly.

Still another important object of my invention is to provide a fluid propeller plug having a sealing and wiping flange of diameter greater than the body of the plug which flange is compressed radially and elongated axially upon entry into a pipe-line, the rubber at the flange being increased in diameter to provide additional material thereby prolonging the life of the plug despite continuous wear at the flange.

Another major object of the invention is to provide a very simple structure which is shrunk by elongation under pressure acting in one axial direction to facilitate movement of the plug in that direction in a pipe-line, but which is swollen and wedged by fluid pressure acting in the axially opposite direction to prevent reverse movement of the plug.

Other objects and advantages of my invention will become apparent during the following discussion of the drawing, wherein.

Figure 1:
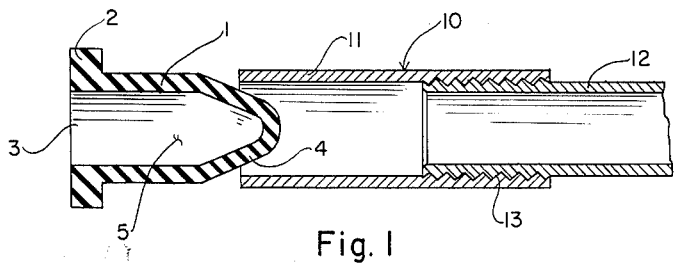
FIG. 1 is a cross-sectional view through a pipe-line, and a plug according to the present invention, the plug being oriented for entry into the pipe-line.
Figure 2:
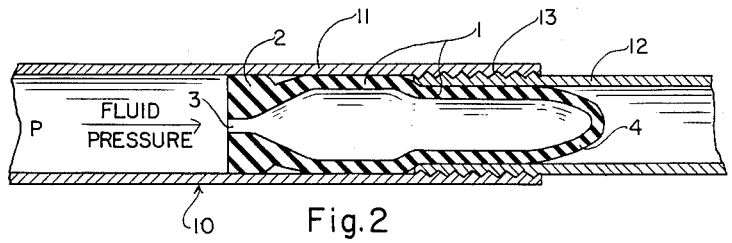
FIG. 2 is a cross-sectional view of the same plug and pipe-line, but with the plug located in the pipe-line and traveling to the right therein.

Referring now to the drawing, the embodiment of the plug according to FIGS. 1 and 2 comprises a rubber body 1 having a flange 2 located at its opening 3 and having a tapered nose 4 closing the other end of the body 1 to form a cup-like cavity 5.

The plug is shown within a pipe-line 10, in FIG. 2, which includes a larger-diameter section of pipe 11 and a smaller-diameter section of pipe 12 screwed thereinto as at 13. FIG. 2 illustrates the manner in which the plug flows past a restriction in diameter of the pipe-line 10 by elongating under the action of the fluid pressure applied in the direction of the arrows P in FIGS. 2 and 5, such elongating causing whatever reduction in the girth of the body 1 and flange 2 is necessary to permit the plug to continue its flow through the pipe-line despite a restriction in pipe-line internal diameter.

Figure 3:
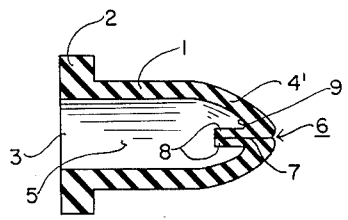
FIG. 3 is a cross-sectional view of a modified plug according to the present invention, the view being taken along line 3—3 of FIG. 4.
Figure 4:
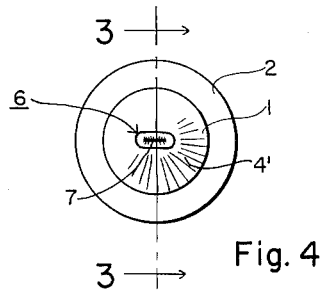
FIG. 4 is an end view of the modified plug of FIG. 3.
Figure 5:
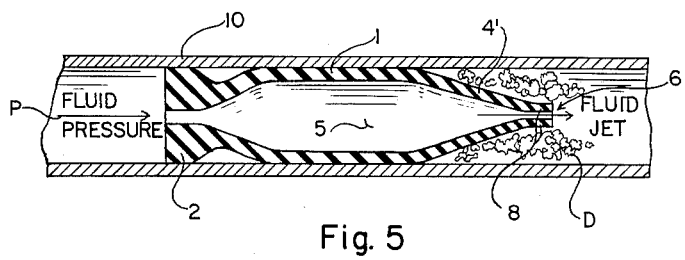
FIG. 5 is a cross-sectional view through a pipe-line, and through a plug of the type shown in FIGS. 3 and 4, the plug having its valved nose turned inside-out by fluid pressure and delivering a fluid jet therethrough to clear away debris built up ahead of the plug.

In the modified embodiment of the invention shown in FIGS. 3, 4 and 5, the action of the plug is the same as in the embodiment of FIGS. 1 and 2, except that the modified embodiment is capable of performing an additional cleaning function. In the modified embodiment, the nose 4' is provided with a valve structure 6 comprising a slit 7 and internal lips 8 located within the cavity 5. By adjusting the axial lengths of the lips 8 and the thickness of the rubber in the vicinity of the junctions 9 of the lips 8 with the nose 4', the amount of pressure in the cavity 5 necesary to turn the lips 8 inside out as shown in FIG. 5 can be adjusted and predetermined.

Thus, if a plug according to FIGS. 3 and 4 encounters or builds up excessive debris D ahead of it and becomes stuck, when the pressure builds up, the lips 8 can turn inside-out as shown in FIG. 5 to deliver a jet of fluid into the debris D and scatter it down the pipe-line toward the next debris trap therein to permit the plug to resume its forward travel in the pipe-line 10.

The reference to "rubber" in this disclosure is intended to include other resilient materials such as neoprene, etc.

I do not limit my invention to the exact form shown in the drawing, for obviously changes may be made therein within the scope of the following claims.

I claim:
1. A resilient fluid-propelled pipe-line plug, comprising a cup-shaped cylindrical body open at one end and tapering down to a smaller diameter at its axially-opposite closed end; a flange around the body near said open end, the flange being disposed radially of the body and the diameter of the flange being greater than the diameter of the body; and valve means at the closed end of the body comprising lip portions extending into the cavity of the body and formed integrally with said closed end, and said lip portions and closed end having a slit extending therethrough and of width sufficient to allow the lip portions to turn inside-out and extend outwardly of the body when the fluid pressure within the cavity exceeds a predetermined value.

2. In a plug as set forth in claim 1, the length of the plug in its axial direction being greater than its diameter as measured across the flange.

3. In a plug as set forth in claim 1, the thickness of the flange being greater than the thickness of the cylindrical wall of the body.

4. A resilient fluid-propelled plug for use in a pipe-line, comprising a cup-shaped cylindrical body of diameter no less than the internal diameter of the pipe-line, said body being open at one end and tapering down to a smaller diameter at its axially-opposite closed end; and a flange around the body of diameter greater than the internal diameter of said pipe-line and greater than the diameter of said cylindrical body, the length of the body being great as compared with the length of the flange and greater than the diameter of the flange, and the radial thickness of the body at all locations being substantially less than the radial thickness of the plug at the flange.

5. In a plug as set forth in claim 4, valve means at the closed end of the body, comprising lip portions extending into the cavity of the body and formed integrally with said closed end, and said lip portions and closed end having a slit extending therethrough of width sufficient to allow the lip portions to turn inside-out and extend outwardly of the body when the fluid pressure within the cavity exceeds a predetermined value.

References Cited in the file of this patent

UNITED STATES PATENTS

| | | |
|---|---|---|
| 616,696 | Cochran | Dec. 27, 1898 |
| 1,700,851 | Oberhuber | Feb. 5, 1929 |
| 1,814,766 | Oberhuber | July 14, 1931 |
| 2,334,032 | Rhodes | Nov. 9, 1943 |
| 2,598,002 | Langdon | May 27, 1952 |
| 2,604,647 | Stephens | July 29, 1952 |
| 2,953,800 | Bowerman | Sept. 27, 1960 |